Figure 2:
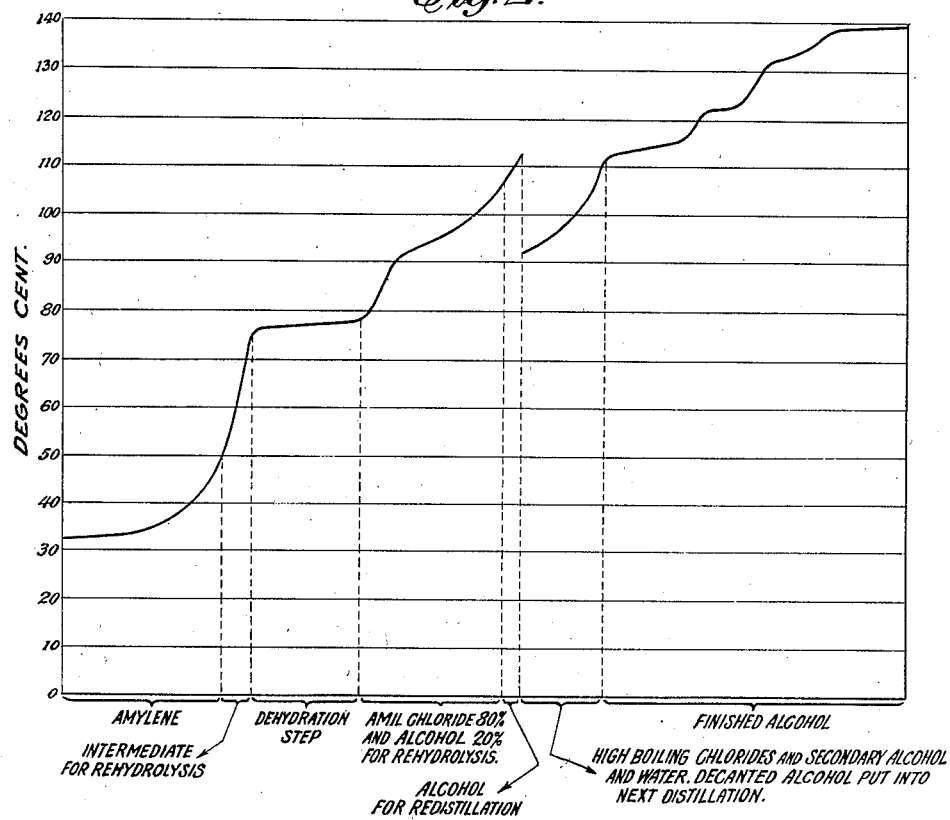

Sept. 12, 1933.　　　　E. E. AYRES, JR　　　　1,926,189

DISTILLATION

Original Filed Feb. 4, 1927

Inventor
Eugene E. Ayres, Jr
By his Attorneys
Kenyon & Kenyon

Patented Sept. 12, 1933

1,926,189

UNITED STATES PATENT OFFICE 1,926,189

DISTILLATION

Eugene E. Ayres, Jr., Swarthmore, Pa., assignor, by mesne assignments, to Fidelity Philadelphia Trust Company, Philadelphia, Pa., a corporation of Pennsylvania, as trustee Application February 4, 1927, Serial No. 165,877
Renewed January 27, 1933

23 Claims. (Cl. 202—42)

My invention relates to recovery of desired products by distillation from mixtures therewith of other substances, and particularly to the recovery of desired products from mixtures therewith of other substances that form constant boiling mixtures with other liquids. My invention also relates to the recovery of alcohols in substantially pure state from mixtures thereof with corresponding chlorides including chlorides containing one chlorine atom and also chlorides containing more than one chlorine atom. My invention also contemplates the recovery of alcohol in substantially pure form from such mixtures which contain as further impurities in addition to the chlorides above mentioned, water and decomposition products such as glycols, chlorhydrins, olefinic ethers, aldehydes, ketones, olefins, and similar substances produced in the hydrolysis of chlorine substitution products for the production of alcohols.

While my process of obtaining products in a substantially pure state is applicable to the recovery of various liquids from mixtures thereof with undesirable substances, I shall proceed with a description of the recovery of the amyl alcohols from a mixture produced by the hydrolysis of amyl chlorides obtained by chlorination of pentanes, it being understood that this description of the recovery of amyl alcohols is given merely as an illustration of the application of my invention in order to assist in the understanding thereof and without limiting the scope of my invention.

When amyl chlorides are produced by chlorination of pentanes, particularly when the chlorinating reaction is effected by heat, and the chlorinated products are hydrolized, a mixture is obtained from the hydrolizing step which includes amylene, water, amyl chlorides, higher boiling chlorides, and one or more of the undesirable substances above named, and amyl alcohols, some of which alcohols are primary and some of which may be secondary.

In the recovery of amyl alcohols in a pure state from such mixtures, a very important step consists in the removal from the desired alcohols of chlorides boiling higher than the corresponding monochlorides and the removal of such other impurities above named as may be present.

Figure 1:
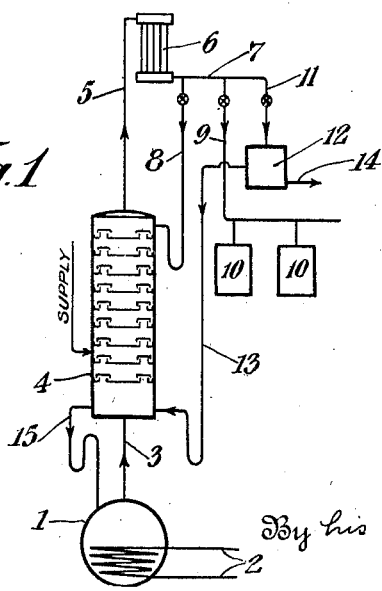

Still referring to the production of substantially pure amyl alcohol from mixtures obtained by hydrolysis as exemplary and merely for the purpose of assisting in the understanding of my invention, I will describe the separation of substantially pure amyl alcohol from such mixtures. The separation is distinctly a rectifying operation and may be carried out in a conventional type of distillation apparatus provided with a rectifying column, a condenser and a decanter. To further assist in the understanding of my invention, a drawing accompanies this specification in which:

Fig. 1 is a diagrammatical showing of apparatus whereby my invention may be practiced; and Fig. 2 is a typical, but not exact, temperature diagram of a distillation embodying my invention.

Referring briefly to the apparatus which may assume any suitable form to meet the requirements of varying conditions in the recovery of various liquids, kettle 1 may be heated in any manner as by a steam coil 2 and vapors pass thru vapor pipe 3 into rectifying column 4. Vapors from the rectifying column 4 pass thru pipe 5 to condenser 6 which may be suitably vented and from which liquids pass from the manifold 7 from which they may be passed by trapped pipe 8 to the top of the column for reflux, or by pipe 9 to any one or more of any number of receivers 10, or by pipe 11 to decanter 12. Supernatant liquid in decanter 12 may be passed by trapped pipe 13 back to kettle 1, liquid settling in decanter 12 being withdrawn therefrom by pipe 14. Liquid may be passed from the bottom of the column 4 to kettle 1 by pipe 15.

In the distillation leading to the recovery of pure amyl alcohols from mixtures obtained by hydrolysis, the first substance distilled is, as shown by Fig. 2 of the drawing, amylene and that substance is advantageously refluxed during the distillation thereof. An intermediate fraction containing amylene and amyl chloride is then taken off with reflux thereof and this fraction is included with the substances introduced into the next hydrolizing operation or in the next distilling operation. Water and amyl chloride next come off as a constant boiling mixture at approximately 76° C. and this step is continued until water ceases to come off. During this step the liquid from condenser 6 is passed to the decanter 12 and the amyl chloride is returned to kettle 1 while the water is withdrawn from the system thru pipe 14. This dehydration is accomplished more rapidly without refluxing because in that way a constant boiling mixture of alcohol and water comes off with the constant boiling mixture of amyl chloride and water and the alcohol-water mixture consists of a larger fraction of water than is contained in the amyl-chloride-water mixture. The alcohol and amyl chloride are decanted from the water and returned to the still. The next step effects the removal of amyl chloride and if continued until amyl chloride ceases to come off, the resulting fraction consists of amyl chlorides and some amyl alcohols. Refluxing is carried out during the taking off of this fraction and this fraction is introduced into the next hydrolizing operation. Then an intermediate cut is taken which consists largely of alcohol containing some amyl chlorides and which is added into the next batch of mixture distilled. The chlorides which boil at higher temperatures than the amyl chlorides such as the poly-chlorides of pentane and the chlorohydrins of pentane, and one or more of the impurities above named, are still in the kettle with the desired alcohols because they boil at higher temperatures than any temperature reached in the distillation and the constant boiling mixtures which they form with water have boiling temperatures higher than any temperature reached while water was present in the distillation. The original water is removed from the distillation at the low temperature of about 76° C. because it forms with amyl chloride a mixture having that constant boiling temperature.

Having substantially eliminated amyl chloride from the distillation, I now, in accordance with my invention, introduce into the distillation sufficient water, e. g., 3% to 6% on the still residue, to form with residual products constant boiling mixtures to the end that undesirable substances, may be distilled from the amyl alcohols at temperatures below the true boiling point of the impurities and of the alcohols. It is thus apparent that in accordance with my invention, I eliminate higher boiling chlorides and other undesirable substances by first substantially eliminating substances that form with water, mixtures boiling at lower constant boiling temperatures in order than mixtures boiling at higher constant boiling temperatures may be formed with the undesirable substances to effect their substantial elimination from the desired alcohols at temperatures below the true boiling point of the alcohols and of said substances.

My invention, however, may be effectively carried out without dehydration preliminary to removal of amyl chloride. For example, the amyl chloride may be distilled out with water without a return of amyl chloride to the still, but, in order to avoid taking out too much alcohol with water, it is necessary to so limit the water present that the still residue becomes dry before the bulk of the alcohol has been distilled, and, on the other hand, in order that poly-chlorides together with associated impurities may be effectively removed, there must be present sufficient water to maintain the distillate wet until the vapors entering the condenser are at a temperature not above the boiling temperature of amyl alcohol but as high as the boiling point of the constant boiling mixture of water and the impurity that it is desirable to remove as a head product. In the purification of amyl alcohols, sufficient removal of impurities, as head products, is obtained by maintaining moisture in the distillate up to the boiling temperature of the lowest boiling amyl alcohol present.

It is because it is not an easy matter in practice to regulate the amount of water in accordance with the above described limitations that I prefer to start with a mixture of unknown water content and to remove this water as a preliminary step until the boiling point of the lowest amyl alcohol has been substantially reached and then to add a known volume of water sufficient to carry out higher boiling substances that form constant boiling mixtures with water.

If water is refluxed to the rectifying column during the removal of chlorides by fractionation, and particularly during such removal of higher boiling chlorides, or if there is present in the distilling operation more water than will pass from the distillation before the desired removal of chlorides by distillation is accomplished, or if both such conditions exist, the residue that contains the desired alcohol and is chloride-free to the desired extent will also contain water. Complete removal of water by the time the desired chloride removal is effected by distillation, is chiefly important in cases in which it is desired that the residue shall consist of dry alcohol. If water is still present in the distillation after the removal therefrom of chlorides which it is desirable to remove by distillation with water, the removal of those chlorides of which the removal is very important will have been accomplished if the rectification has been carefully conducted. In this connection it is pointed out that the chlorides of which the removal is most important are the chlorides that form with water constant boiling mixtures that have a low percentage of water. Such chlorides form with water constant boiling mixtures that boil at temperatures near the boiling temperature of constant boiling mixtures formed by the alcohol with water. The fact that the boiling point of the constant boiling mixtures formed by such chlorides with water may be a little higher than the boiling point of the constant boiling mixtures formed by the alcohol with water does not defeat the effectiveness of this invention because the fractionation is carried out by rectification and such chlorides are carried into the overhead products, when water is present, without causing an unduly large quantity of alcohol to pass out of the column as vapor provided the rectification is carried out carefully. The whole operation may be divided into parts that are carried out in separate or successive rectifying columns, for example, by introducing amylene-freed mixture into a column and obtaining wet alcohol as a residue by distilling off the mono- and poly-chlorides with water and some alcohol.

In any case, an important feature of my invention is that water should be present in the distillation over the whole range from the lowest boiling temperature of the constant boiling mixtures formed by impurities up to the highest boiling temperature of those mixtures that is below the true boiling point of the lowest boiling dry amyl alcohol; or the upper limit may be the boiling temperature of the constant boiling mixture formed with water by whatever impurity or impurities it is desired to remove, provided that temperature is below the boiling temperature of any amyl alcohol present. Thus, the impurities that would normally remain in the residue after the distillation overhead of the alcohols are carried wholly or in part over as a head product no matter what the relation may be of the boiling temperatures of the constant boiling mixtures of these impurities with water to the boiling temperatures of the constant boiling mixtures of amyl alcohols with water.

The extent to which the impurities are thereby transposed from the tails to the heads depends largely upon the water content of the constant boiling mixtures of impurities as compared with the water content of the constant boiling mixtures of amyl alcohols. For example, the constant boiling mixtures of the amyl alcohols contain about fifty percent water, whereas some of the dichlorides of pentane form constant boiling mixtures containing only ten percent water, while other dichlorides and some tetrachlorides of pentane, for example, contain about ninety percent water. The latter chlorides are, therefore, not carried over in the distillation heads to the same extent as the former chlorides, but tend to remain in the residue.

In the distillation of higher alcohols, an important reason for obtaining ahead of the alcohol such high boiling impurities as distill with a small amount of water is that there is a tendency during the distillation of the alcohol for minute quantities of water to form by the spontaneous decomposition of the alcohol to form olefins. This water tends to carry objectionable traces of higher boiling substances over with the alcohol. On the contrary, high boiling substances requiring much water for the formation of constant boiling mixtures do not pass over to an appreciable extent with the very small amounts of water formed by alcohol decompositions.

By the practice of my invention I have recovered amyl alcohols from mixtures produced by hydrolysis of crude amyl chlorides that contain poly-chlorides of pentane, and which mixtures were the result of hydrolysis operations in which the conversion of mono-chlorides to alcohols varied from 10% to 100%. In spite of the varying composition of those mixtures, as indicated by the variations in the degree of conversion of chlorides into alcohols and in spite of the presence in them of as much as 3% of poly-chlorides, I have, by the practice of my invention, recovered on a commercial scale, substantially all of the alcohols in such mixtures, the alcohols uniformly containing less than 0.01% of chlorine and frequently containing less than 0.001% of chlorine.

While I have described one application of my invention in great detail and in connection with a limited class of alcohols it will be apparent to those skilled in the art that the principles involved in the recovery of those alcohols are applicable, with appropriate modification if necessary, to the recovery of other alcohols in pure state from mixtures thereof with similar or corresponding impurities.

For example, butyl and hexyl alcohols may be similarly obtained in substantially pure state from similar or corresponding mixtures thereof with chlorides and other impurities. Furthermore, my process may be employed wherever it is desirable to remove substances from a liquid of relatively lower boiling point prior to distillation of the liquid. For example, butyric acid which boils at 162° C. can be brought over as a head product from methyl butyrate which boils at 103° C. because the constant boiling mixture of butyric acid with water boils at 99° C. and contains only 32% water whereas the constant boiling mixture of methyl butyrate contains 45% water. This procedure makes it possible to reduce the amount of butyric acid that is concentrated in the residue by the distillation of the ester thus reducing losses by decomposition. Another example is the removal of butyric acid substantially completely from propionic acid which boils at 140° C. By the practice of my invention this separation is brought about much more completely and at lower cost by taking advantage of the great difference between the water content of the respective constant boiling mixtures of butyric and propionic acids than by an ordinary rectification. Accordingly my invention comprehends the separation from a liquid that is capable of being distilled to dryness, of relatively higher boiling substances that form with water constant boiling mixtures boiling at temperatures below the boiling point of the liquid, some of such mixture may have a lower water percentage and others may have a higher water percentage than the water percentage of constant boiling mixtures formed by the liquid with water, the substances being removed as head products by distillation with water. To accomplish this result my invention contemplates distillation with sufficient water to maintain moisture in the distillate preferably until the boiling temperature has been reached of the highest boiling of the constant boiling mixtures formed between the substances and water, leaving a dry residue containing the liquid. The substances forming with water constant boiling mixtures of higher water percentage than the water percentage of constant boiling mixtures formed by the liquid with water can, of course, be only partially removed as head product of distillation and the remainder of such substances must remain as a residue after the dry distillation of the liquid therefrom. I have found that even such partial removal of substances from the liquid minimizes the tendency of substance not taken over as head products, to accumulate in the residue that is continually returned to successive distillations. Accordingly, my invention contemplates such incomplete removal of such substances, as head products, from the liquid as well as the more complete removal of the substances forming low water-percentage mixtures. And my invention contemplates also the use of only enough water to maintain moisture in the distillate until the boiling temperature has been reached of some lower boiling constant boiling mixture, e. g., until the temperature has been reached of the constant boiling mixture of whatever substance is desired as a head product of distillation.

Furthermore, it will be apparent to those skilled in the art that under varying conditions encountered in recovery of pure alcohol produced by hydrolysis of corresponding chlorine compounds, variations from the temperatures indicated by the accompanying temperature chart may be made to suit existing conditions. It will also be apparent that variations may be made in the fractions obtained by distillation without departing from the spirit of my invention. It is also to be understood that the lateral distances in the temperature chart do not indicate percentages but more nearly approximate the time element of the alcohol recovery operation.

The products of hydrolysis of amyl chlorides obtained by chlorination of pentane with heat contain primary normal amyl alcohol, the primary iso-amyl alcohols, the normal secondary amyl alcohols and secondary iso-amyl alcohol;

and purification in accordance with my invention produces a mixture of these alcohols that is substantially free of chlorine, and will produce similarly pure mixtures of the butyl and hexyl alcohols depending, of course, upon the substance chlorinated.

What I claim and desire to secure by Letters Patent is:

1. In a process for the separation from a liquid that is capable of forming a constant boiling mixture with water, of higher boiling substances that form with water constant boiling mixtures boiling at temperatures below the boiling point of the liquid but not below the boiling point of the constant boiling mixture formed by the liquid with water and containing a lower percentage of water than is contained in constant boiling mixtures of the liquid with water, the step comprising distilling with rectification a mixture of the liquid and substance with water to dryness leaving a residue containing the liquid.

2. In a process for the separation from a liquid that is capable of forming a constant boiling mixture with water, of higher boiling substances that form with water constant boiling mixtures boiling at temperatures below the boiling point of the liquid but not below the boiling point of the constant boiling mixture formed by the liquid with water and containing a lower percentage of water than is contained in constant boiling mixtures of the liquid with water, the steps comprising adding to a mixture comprising the liquid and a lesser proportion of the substances a quantity of water not substantially in excess of what is necessary to maintain water present until the substances are distilled off, and with rectification distilling off constant boiling mixtures of water and said substances and leaving a residue containing the liquid.

3. In a process for the separation from a liquid that forms a constant boiling mixture with water, of higher boiling substances that form with water constant boiling mixtures boiling at temperatures below the boiling point of the liquid but not below the boiling point of the constant boiling mixture formed by the liquid with water, some of said last named mixtures having a lower water percentage and others having a higher water percentage than the water percentage of constant boiling mixtures of the liquid with water, the steps comprising subjecting a mixture of said liquid and a lesser proportion of said substances to distillation and distilling from the liquid with water higher boiling substances that form with water constant boiling mixtures of low water percentage, leaving a mixture freed of said last-mentioned substances and containing the liquid and insufficient water to form constant boiling mixtures with all of the liquid, bringing the residue to dryness, and with rectification distilling off the liquid leaving in the residue higher boiling substances that form with water constant boiling mixtures of high water percentage.

4. In a process for the separation from a liquid that is capable of forming a constant boiling mixture with water, of higher boiling substances that form with water constant boiling mixtures boiling at temperatures below the boiling point of the liquid but not below the boiling point of the constant boiling mixture formed by the liquid with water and containing a lower percentage of water than is contained in constant boiling mixtures of the liquid with water, the steps comprising fractionally distilling the mixture with sufficient water to maintain moisture in the distillate up to the boiling temperature of the liquid.

5. In a process for the separation from a liquid that is capable of forming a constant boiling mixture with water, of higher boiling substances that form with water constant boiling mixtures boiling at temperatures below the boiling point of the liquid but not below the boiling point of the constant boiling mixture formed by the liquid with water, the step comprising fractionally distilling a mixture of said liquid and a lesser proportion of said substances with sufficient water to maintain moisture in the distillate while the temperature of distillation rises through a range of temperatures that includes the boiling points of the constant boiling mixtures with water of the substances which it is desired to remove from a residue containing the liquid, and thereby producing a residual mixture freed of said substances and containing the liquid.

6. In a process for obtaining substantially pure alcohols from a mixture thereof with higher boiling chlorides that form with water constant boiling mixtures boiling at temperatures lower than the boiling point of the alcohols but not below the boiling point of constant boiling mixtures formed by the alcohols with water and containing a lower percentage of water than is contained in constant boiling mixtures of the alcohols with water, the step comprising distilling such chlorides with water from the mixture leaving a residue containing the alcohols.

7. In a process for obtaining substantially pure alcohols from a mixture thereof with higher boiling chlorides that form with water constant boiling mixtures boiling at temperatures lower than the boiling point of the alcohols and containing a lower percentage of water than is contained in constant boiling mixtures of the alcohols with water, the step comprising distilling the mixture with sufficient water to maintain moisture in the distillate while the temperature of distillation rises through a range of temperatures that includes the boiling points of the constant boiling mixtures with water of the chlorides which it is desired to remove from a residue containing the alcohols and any such chlorides that are not removed as head products.

8. In a process for the purification of amyl alcohols containing higher boiling chlorine compounds derived from pentane, the step comprising distilling a mixture of said alcohols and a lesser proportion of said compounds with sufficient water to maintain moisture in the distillation at temperatures up to the boiling point of the lowest boiling alcohol and leaving a residual mixture substantially freed of such compounds and containing alcohol.

9. In a process for the purification of amyl alcohols containing higher boiling chlorine compounds derived from pentane, the step comprising distilling a mixture of said alcohols and a lesser proportion of said compounds with sufficient water to maintain moisture in the distillation while the temperature of distillation rises through a range of temperatures that includes the boiling points of the constant boiling mixtures with water of the compounds which it is desired to remove from a residue containing the alcohols, and thereby producing a residual mixture substantially freed of said last-mentioned compounds and containing alcohol.

10. In a process for the purification of amyl alcohols containing a minor proportion of higher boiling chlorine compounds derived from pentane, the steps comprising first removing from the mixture a part of such compounds present by distillation with water and then distilling off the alcohols substantially in the absence of water from the residue.

11. In a process for obtaining substantially pure amyl alcohols from a mixture therewith of a lesser proportion of higher boiling chlorine compounds derived from pentane, the steps comprising distilling off with water from the alcohol-containing mixture compounds forming with water constant boiling mixtures of relatively high compound content, leaving a residue containing alcohol, bringing to dryness said residue, and distilling off the alcohols from the dry residue leaving a residue containing compounds that form with water constant boiling mixtures of relatively low compound content.

12. In a process for obtaining substantially pure amyl alcohols from a mixture of the alcohols with a lesser proportion of higher-boiling chlorine compounds derived from pentane, the steps comprising subjecting the mixture to rectification and maintaining water-vapor in the vapors rising from the liquid while distilling therefrom such of said chlorine compounds as form with water constant boiling mixtures in which the proportion of chlorine compound present is greater than the proportion of amyl alcohols in constant boiling mixtures formed by the alcohols with water and thereby forming a residue containing amyl alcohols substantially free of said last-mentioned chlorine compounds.

13. In a process for obtaining substantially pure amyl alcohols from mixtures therewith of a lesser proportion of corresponding poly-chlorides, the steps comprising distilling off the chlorides with sufficient water to maintain moisture in the distillate at all temperatures that are not above the boiling point of the lowest boiling amyl alcohol present, and are as high as the boiling point of the constant boiling mixture of the chlorides desired as head products, leaving a residual mixture containing alcohol.

14. A process for obtaining substantially pure amyl alcohols from mixtures therewith of a lesser proportion of corresponding mono- and poly-chlorides, which comprises removing mono- and poly-chlorides by distillation with water to a point at which amyl alcohol distilled from the residue contains less than one percent of combined chlorine, and distilling amyl alcohol from the residue.

15. In a process for the separation of a liquid capable of forming a constant boiling mixture with water, from a mixture containing also substances that boil at higher temperatures than such liquid and form with water constant boiling mixtures boiling at temperatures below the boiling point of such liquid but not below the boiling point of constant boiling mixtures formed by the liquid with water and containing a lower percentage of water than is contained in constant boiling mixtures formed by the liquid with water, the step comprising fractionally distilling a mixture of said liquid and a lesser proportion of said substances with sufficient water to maintain moisture in the distillation so long as higher boiling substances are present that form with water constant boiling mixtures having a lower percentage of water than constant boiling mixtures formed by the liquid with water and leaving a residue containing said liquid.

16. In a process for the purification of amyl alcohols containing higher boiling chlorine compounds derived from pentane, the step comprising fractionally distilling a mixture of said alcohols and a lesser proportion of said substances with a quantity of water sufficient to maintain moisture in the distillation so long as such higher chlorides are present in the alcohols as form with water constant boiling mixtures having a lower percentage of water than constant boiling mixtures formed by the alcohols with water but insufficient to form constant boiling mixture with all of the alcohol.

17. In a process for the separation of a liquid capable of forming a constant boiling mixture with water, from a mixture containing also substances that boil at higher temperatures than such liquid and form with water constant boiling mixtures boiling at temperatures below the boiling point of such liquid but not below the boiling point of constant boiling mixtures formed by the liquid with water and containing a lower percentage of water than is contained in constant boiling mixtures formed by the liquid with water, the step comprising distilling such substances with water from a mixture that contains the liquid and a lesser portion of said substances, leaving a residue containing the liquid.

18. In a process for the purification of amyl alcohols containing higher boiling chlorine compounds derived from pentane, the steps comprising subjecting a mixture of amyl alcohols and a lesser proportion of said compounds to rectification in a rectifying column while supplying heat at the bottom of the column and a reflux liquid at the top of the column, maintaining water present in the mixture so long as it contains higher boiling chlorides that form with water constant boiling mixtures having a lower percentage of water than constant boiling mixtures formed by the alcohols with water, withdrawing from the top of the column vapors of the constant boiling mixture of water and said compounds, and thereby producing a residue free of such higher boiling chlorides and containing alcohol.

19. In a process for the separation of a liquid capable of forming a constant boiling mixture with water, from a mixture containing also substances that boil at higher temperatures than such liquid and form with water constant boiling mixtures boiling at temperatures below the boiling point of such liquid but not below the boiling point of constant boiling mixtures formed by the liquid with water and containing a lower percentage of water than is contained in constant boiling mixtures formed by the liquid with water, the step comprising subjecting a mixture comprising the liquid and a lesser proportion of said substances to distillation with water and distilling from the mixture constant boiling mixtures comprising water and said substances, and maintaining sufficient water in the mixture undergoing distillation to cause substantially all of said substances to pass therefrom as constituents of such constant boiling mixtures and leave a residue comprising said liquid substantially free of said substances.

20. In a process for the purification of mixtures of alcohols having four to six carbon atoms with higher boiling chlorine compounds derived from corresponding hydrocarbons, the steps comprising subjecting to distillation with water a mixture comprising an alcohol and a lesser proportion of said compounds derived from the hydrocarbon corresponding to said alcohol and forming with water constant boiling mixtures having a water percentage lower than that of such mixtures formed with the alcohol and distilling from the mixture constant boiling mixtures of said compounds with water, and maintaining water in the mixture undergoing distillation until substantially all of said compounds have passed therefrom as constituents of said constant boiling mixtures leaving a residue comprising said alcohol substantially free of said compounds.

21. In a process for the separation of amyl alcohols from a mixture thereof with chlorine compounds derived from pentanes, the steps comprising subjecting to rectification in a rectifying column a mixture of amyl alcohols with a lesser proportion of higher-boiling chlorine compounds derived from pentanes and with monochlor derivatives of pentane while supplying heat at the bottom of the column and a reflux at the top of the column, maintaining water-vapor present in the vapors rising from the liquid in the rectifying operation so long as the liquid contains a substantial proportion of higher-boiling chlorides capable of being distilled with water from the amyl alcohols, withdrawing from the top of the column vapors of water and chlorides and alcohols, and thereby producing a residue from which substantially chlorine-free amyl alcohols can be removed by dry distillation.

22. In a process for the separation of amyl alcohols from a mixture thereof with chlorine compounds derived from pentanes, the steps comprising subjecting to rectification in a rectifying column a mixture of amyl alcohols with a lesser proportion of di-chlorides of pentanes and with monochlorides of pentanes while supplying heat at the bottom of the column and a reflux at the top of the column, maintaining water-vapor present in the vapors rising from the liquid in the rectifying operation so long as the liquid contains a substantial proportion of di-chlorides of pentanes, withdrawing from the top of the column vapors of water and chlorides and alcohols, and thereby producing a residue containing amyl alcohols and substantially free of said chlorides.

23. In a process for the purification of amyl alcohols containing a minor proportion of higher-boiling chlorine compounds derived from pentane, the steps comprising first removing from the mixture a part of such compounds present by rectification in which water-vapor is maintained present in the vapors rising from the liquid and then distilling off the alcohols substantially in the absence of water from the residue.

EUGENE E. AYRES, JR.